Jan. 24, 1933.  H. W. KELLY  1,895,331
METHOD OF MANUFACTURING LEAD TAPES
Filed July 11, 1930
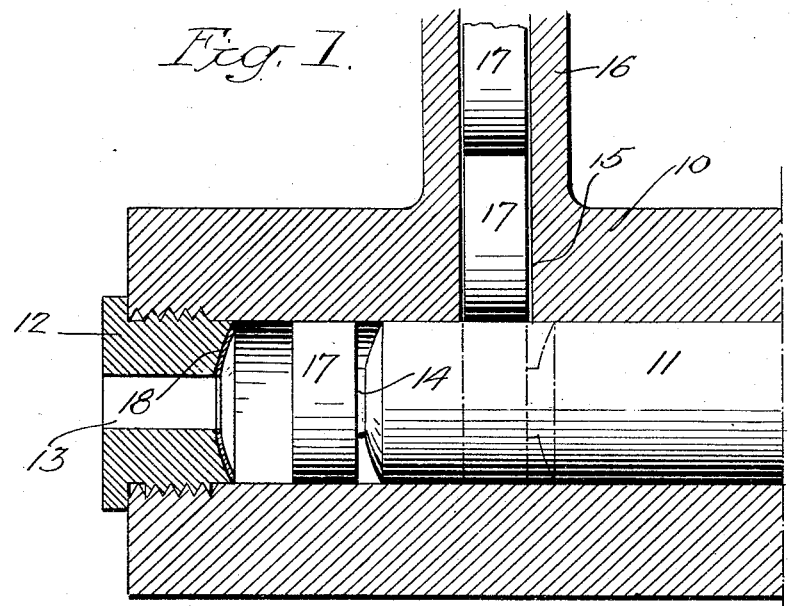
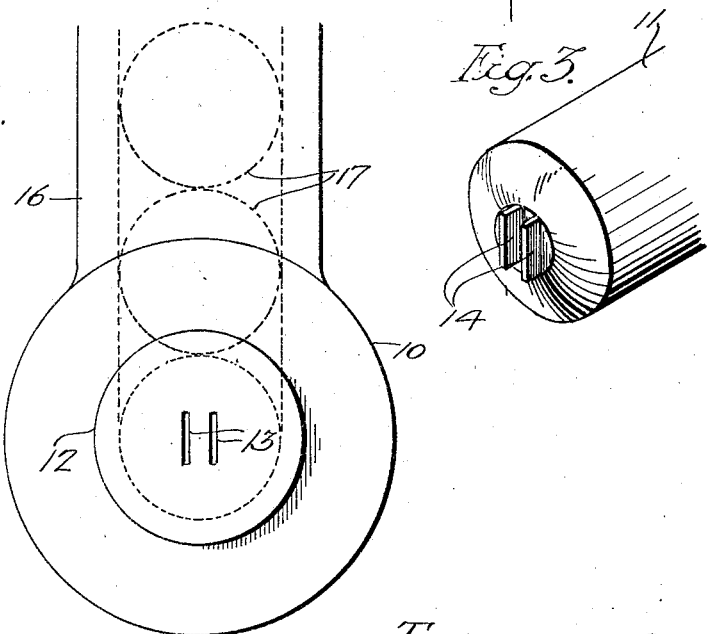
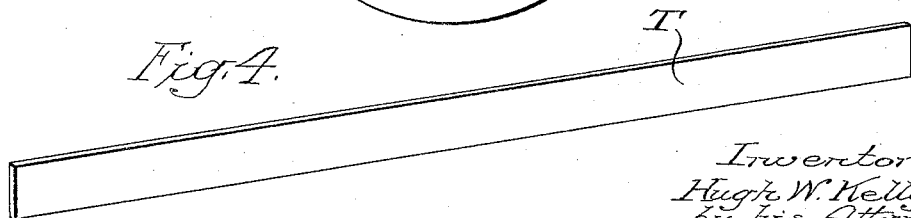
Inventor:
Hugh W. Kelly
by his Attorneys
Howson & Howson Patented Jan. 24, 1933

1,895,331

UNITED STATES PATENT OFFICE

HUGH WILLIAMSON KELLY, OF WOODBRIDGE, NEW JERSEY

METHOD OF MANUFACTURING LEAD TAPES

Application filed July 11, 1930. Serial No. 467,344.

This invention relates to a method of and apparatus for producing thin narrow lead strips or tapes, and more particularly tapes suitable for use in securing track torpedoes to railway tracks.

An important object of the invention is the provision of an apparatus which will produce such articles rapidly and accurately and will produce them in such manner that they are straight and easily manipulated.

A further object of the invention is the production of an apparatus of this character which may be cheaply manufactured, which will be durable and efficient in service and a general improvement in the art.

These and other objects I attain by the construction shown in the accompanying drawing, wherein, for the purpose of illustration, I have shown a preferred embodiment of my invention and wherein:

Fig. 1 is a vertical sectional view through a press for producing strips in accordance with my invention;

Fig. 2 is a front elevation thereof;

Fig. 3 is a perspective view of the press plunger; and

Fig. 4 is a perspective view of the tape produced.

Referring now more particularly to the drawing, the numeral 10 generally designates a press cylinder having operating therein a plunger 11. The extrusion end of the press comprises a die 12 having one or more extrusion openings 13 of narrow width and of the desired depth. These extrusion openings are placed with their greatest dimension vertically for a purpose presently to appear. The forward end of the plunger 11 is provided with projections 14 adapted to enter the inner ends of the openings 13 and cut off the formed tapes from any material remaining in the press. Slightly in advance of the point of maximum retraction of plunger 11, indicated by the dotted lines on Fig. 1, the wall of the press has an opening 15 formed therein, this opening communicating with a guide chute 16 of any suitable character through which the material is fed into the press cylinder. The material constitutes cast lead slugs 17 of substantially the same diameter as the bore of the cylinder and these slugs are preferably delivered to the cylinder by gravity as illustrated although any suitable feeding means might be employed.

In operation of the press, as the plunger is withdrawn at the end of each working stroke a slug 17 drops into the cylinder and as the plunger advances is forced therebefore and extruded through the openings 13 in the form of a thin narrow tape T with its greatest dimension vertically disposed, these tapes falling upon any suitable conveyor (not herein shown) for removing the same. Since the greatest dimension of these tapes is vertically disposed, the tapes are self-supporting and will not tend to kink and plicate as is the case where any attempt is made to deliver such tapes in any position but vertical. When the plunger has advanced to a sufficient extent that the projecting portions 14 thereof engage in the inner ends of openings 13, the movement of the plunger terminates, leaving within the press a thin residue 18 which ordinarily remains against the die 12. As the next slug is advanced, the heat generated by pressure and impact in the pressing operation causes this residue to be welded to the slug and to pass from the extrusion openings 13 as a portion thereof. The vertical arrangement of the extrusion openings is extremely important as it is practically impossible to provide a conveyor moving at a sufficient rate of speed to take care of the tape as it is formed, particularly since the plungers of such presses are usually advanced by a cross head actuated from a crank shaft and, accordingly, have a variable movement during the pressing operation. Under these conditions it will be obvious that any arrangement which tends to kinking or plication of the formed tape would involve considerable labor in straightening the tapes after their formation.

While the apparatus has been above described as employed in the formation of lead tapes, it might, quite obviously, be employed in the formation of tapes for any relatively soft material having a comparatively low fusing point.

Since the arrangement employed is capable of some modification, I do not wish to be understood as limiting myself thereto except as hereinafter claimed.

I claim:

The method of producing tapes of ductile material having a relatively low fusing point, consisting in extruding a slug of the metal through a die by means of a plunger, cutting off the tape at the die opening by the plunger whereby a residue is left in the press and employing the heat generated by pressure of a successive press charge to integrate said residue with the succeeding charge.

HUGH WILLIAMSON KELLY.